United States Patent [19]
Colangelo

[11] 3,781,999
[45] Jan. 1, 1974

[54] CUTTING TOOL SETTING DEVICE

[76] Inventor: Peter J. Colangelo, 168 Laughlin Rd., East, Stratford, Conn. 06497

[22] Filed: Apr. 26, 1972

[21] Appl. No.: 247,843

[52] U.S. Cl............... 33/185 R, 33/170, 33/172 R, 33/172 D
[51] Int. Cl......................... B27g 23/00, G01b 3/22
[58] Field of Search..................... 33/185 R, 172 D, 33/170, 172 R

[56] References Cited
UNITED STATES PATENTS

| | | | |
|---|---|---|---|
| 3,636,636 | 1/1972 | Baldyga | 33/185 R |
| 3,304,616 | 2/1967 | Coulman | 33/170 |
| 2,098,838 | 11/1937 | Rusnak | 33/172 D |
| 3,542,323 | 11/1970 | Arnold | 33/172 R X |
| 2,910,779 | 11/1959 | Patton | 33/170 |
| 2,523,277 | 9/1950 | Campbell | 33/172 R |
| 3,217,418 | 11/1965 | Wennerberg | 33/172 R |
| 2,506,924 | 5/1950 | Huber | 33/172 R |

FOREIGN PATENTS OR APPLICATIONS

| | | | |
|---|---|---|---|
| 878,103 | 9/1961 | Great Britain | 33/172 R |
| 229,451 | 1/1944 | Switzerland | 33/172 R |

Primary Examiner—William D. Martin, Jr.
Assistant Examiner—Milton S. Gerstein
Attorney—Thomas L. Tully et al.

[57] ABSTRACT

A device for temporary attachment over the spindle arm of a boring machine to enable the precise positioning of a boring tool in the machine. The tool setting device comprises a mounting element and an adjustable carriage slidably attached to the mounting element, the exact positioning of the carriage on the mounting element being made possible by the cooperation of a ture scale on the latter with a vernier on the carriage. The carriage also comprises an indicator gauge which is adjustably secured thereto and which is adapted to correlate the position of the carriage on the mounting element with the axis of rotation of the spindle and to indicate the precise position at which the cutting bit of the boring tool should be secured in the machine in order to bore a hole having the precise dimensions indicated by the vernier.

6 Claims, 5 Drawing Figures

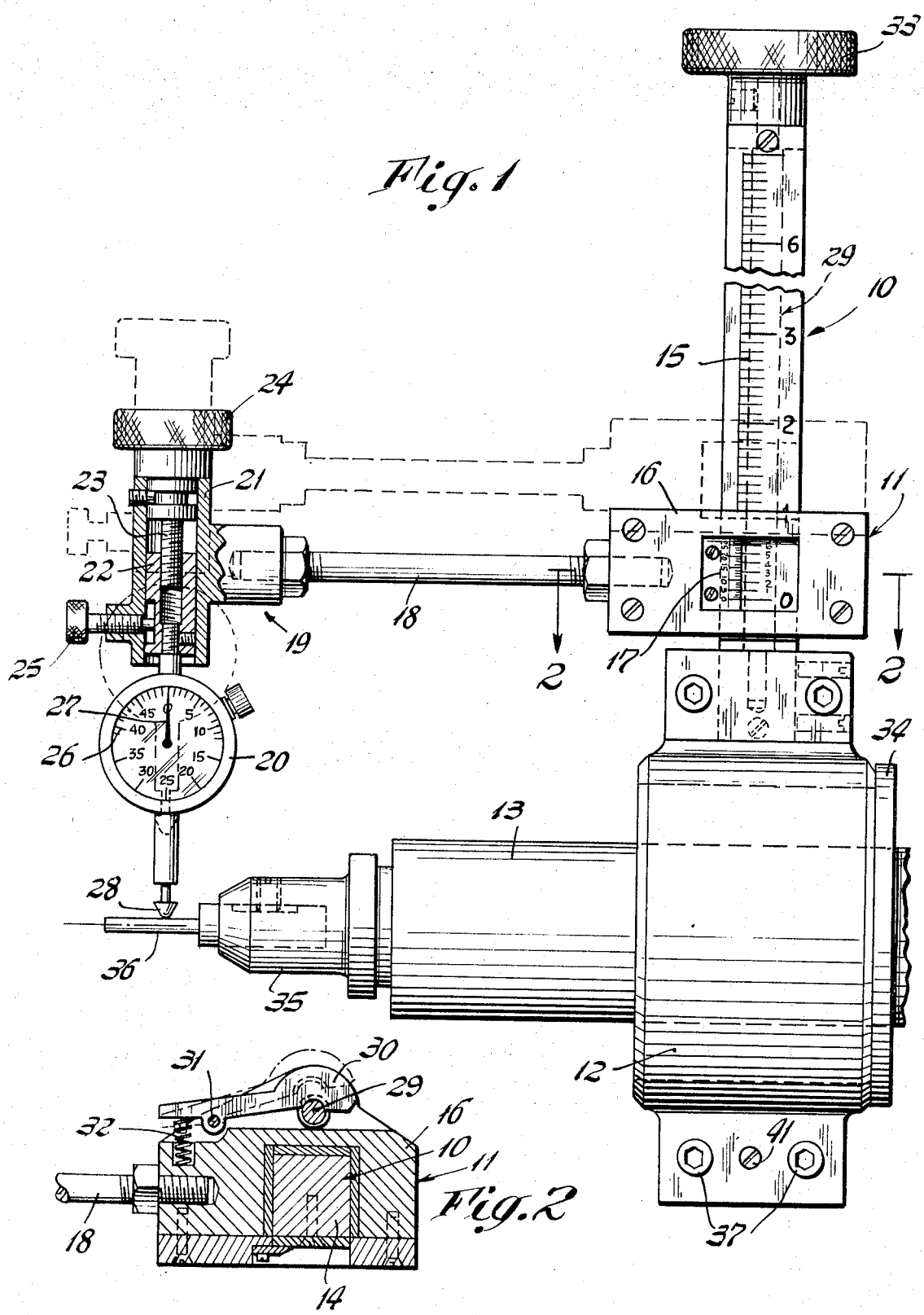

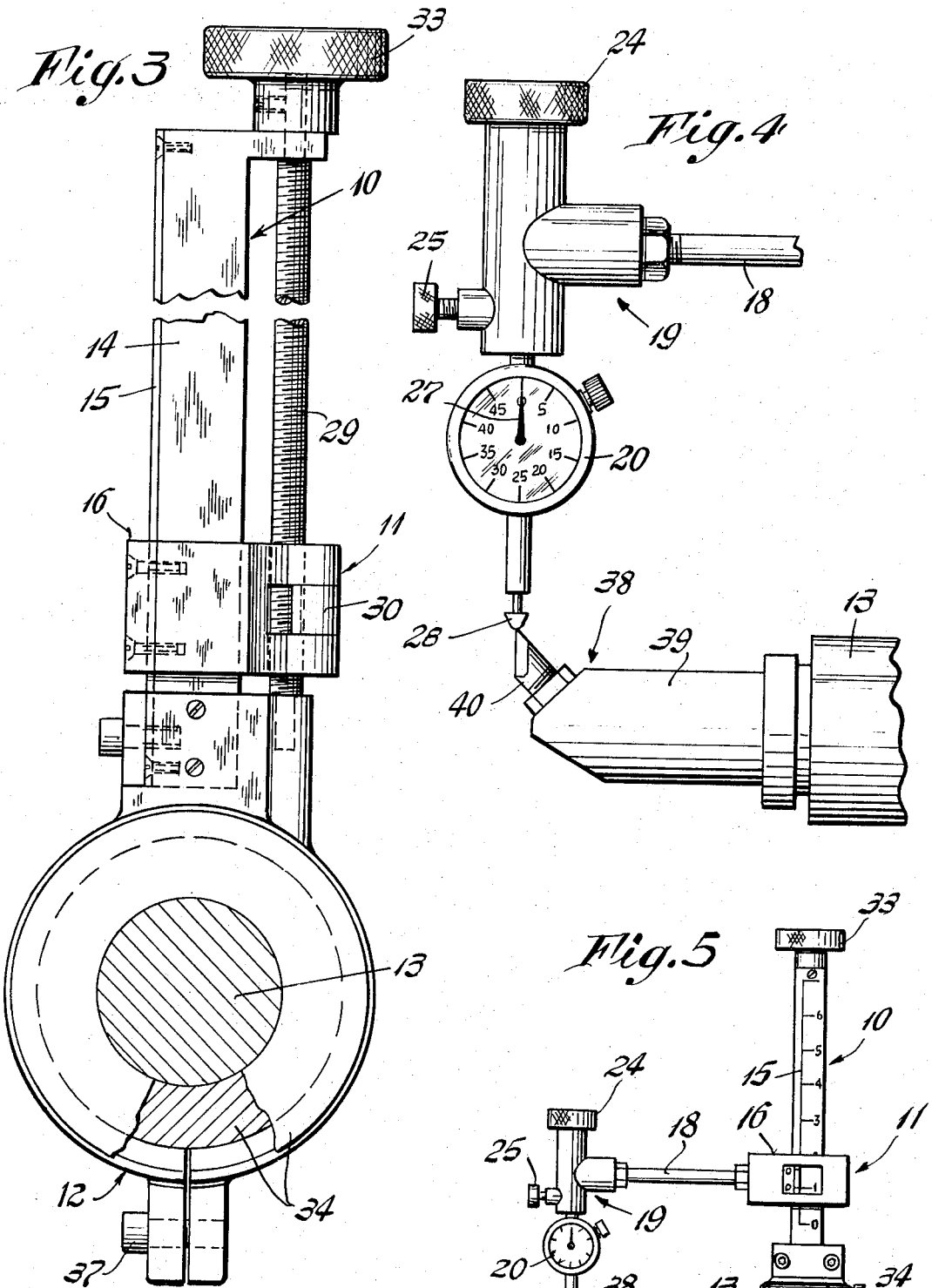

CUTTING TOOL SETTING DEVICE

A number of different means have been proposed and used for the accurate positioning of boring tools in boring machines. These include hand-held measuring devices, internal micrometer devices, devices for setting the tool in the boring mandrel outside the machine, and a variety of other systems which are expensive, cumbersome because of their size and/or operating procedure, inefficient because of the amount of time and/or skill required for their use, and ineffective because the proper adjustment of the cutting tool in a device separate from the boring machine does not always coincide with the proper adjustment of the cutting tool on the boring machine.

Manual measuring devices are commonly used for setting boring tools in boring machines but this requires extensive training and experience before an operator can develop the skill to manually set a boring tool within very close tolerances. Even when the skill has been acquired, the setting operation is time-consuming and burdensome.

In an effort to overcome these disadvantages, devices have been proposed for the setting of boring tools prior to the insertion of the tool into the spindle of the boring machine. Such devices are expensive, cumbersome, inefficient and/or ineffective, as discussed supra, and are limited to use in connection with tool holders or mandrels having a certain diameter and shape. Thus, if a shop has two or more boring machines which use mandrels of different sizes, then a separate setting device is required for each boring machine.

It is the principal object of the present invention to provide a novel, simple, relatively inexpensive boring tool setting device which is portable, suitable for use on a variety of boring machines and extremely accurate.

It is another object of this invention to provide a simple, lightweight boring tool setting device which is easy to mount right on the boring machine and which enables the precise positioning of the boring tool in the machine in a manner requiring a minimum amount of time, effort and skill.

These and other objects and advantages of the present invention will be apparent to those skilled in the art in the light of the present disclosure, including the drawings in which:

FIG. 1 is a front view of the tool setting device of the present invention mounted on the spindle of a boring machine in association with a centering pin, FIG. 2 is a cross-section taken along the line 2—2 of FIG. 1, FIG. 3 is a side view of the device of FIG. 1, FIG. 4 is a segmented front view of the present device showing the indicator element and the cutting tool in contact, and FIG. 5 is a front view, to a reduced scale, showing the present tool setting device mounted on the spindle of the boring machine in association with a perfectly centered cutting tool.

The tool setting device of the present invention, as shown by FIG. 1 of the drawings, comprises a mounting element 10 and a carriage element 11 slidably attached thereto. The mounting element 10 comprises a base collar 12 for releasably attaching the device over the spindle 13 of a boring machine, and a scale member column 14 fixed to the base collar 12 and extending therefrom in a direction perpendicular to the axis of rotation of spindle 13. The scale member column 14 carries a fixed true scale 15 having graduations corresponding to the radius of the hole to be bored.

The carriage element 11 comprises a vernier element 16 slidably mounted on scale member column 14 and containing a vernier scale 17 adapted to cooperate with true scale 15 in enabling the precise positioning of the carriage element 11 relative to the mounting element 10. Carriage element 11 also comprises an extension bar 18 fixed to and extending from the vernier element 16 and an indicator element 19 fixed to said extension bar and having an indicator gauge 20 adjustably mounted thereon for movement in a direction parallel to the scale member column 14 and towards or away from the indicator element 19.

The indicator element shown in FIG. 1 comprises a housing 21 fixed to extension bar 18, a cylindrical slide nut 22 slidably mounted against rotation within the housing 21, an indicator gauge 20 attached to the slide nut 22 and an adjustment drive bolt 23 which threadably engages the slide nut 22 and is mounted for fixed rotation within housing 21 whereby rotation of the knob 24 attached to drive bolt 23 causes the gauge 20 to move towards or away from the housing 21, as desired. Also a lock bolt 25 is provided which threadably engages the housing 21 and can be tightened to engage the slide nut 22 to prevent its movement and thus lock the indicator gauge 20 in a desired position.

The indicator gauge is a conventional item such as a Federal Indicator Gauge B71 and has a graduated dial 26, a pointer 27 and a depressible feeler 28 associated with pointer 27 whereby the degree of depression of the feeler 28 is indicated by the position of the pointer 27 on the dial 26.

As more clearly illustrated by FIGS. 2 and 3 of the drawings, the present tool setting device includes means for adjusting the position of the carriage element 11 relative to the mounting element 10, comprising a threaded drive member 29 which is rotatably fixed to the mounting element 10 and threadably engages the vernier element 16 by means of a half-nut lever 30. Lever 30 is attached to the vernier element 16 by pivot 31 and the half threads of the lever are urged into engagement with the cooperating threads of drive member 29 by spring 32. However pivoting of the lever 30 caused by depression of the spring 32 withdraws the half threads from engagement with drive member 29 whereby the vernier element 16 can be freely slid up or down the length of the scale member column 14. The drive member 29 is provided with a knurled wheel 33 for rotating the drive member to cause the vernier element 16 to travel up or down the scale member column 14 gradually, as desired, to a precise position. Depression of half-nut lever 30 enables the swift adjustment of the vernier element 16 to an approximately desired position, at which the lever 30 is released to engage the drive member 29 and the precisely desired position is obtained by rotation of the wheel 33.

Referring to FIG. 1, the true scale 15 cooperates with the vernier scale 17 whereby ultimately the position of the lower tip of feeler 28 of the indicator gauge relative to the graduations of the true scale 15 can be set within a tolerance of one one-thousandth of an inch by means of the vernier scale 17.

The present tool setting device is suitable for use on any boring machine having a rotary spindle to which is secured a cutting tool comprising a mandrel or collet having a cutting bit adjustably attached thereto. Illustrative machines are boring machines such as the De Veilg Jig Mill, jig borers and milling machines which are often used with cutting tools for boring holes.

The following procedure may be followed in connection with the use of the present tool setting device. Referring to FIG. 1 of the drawings, the base collar 12 of the device is centered over the spindle 13 of the boring machine. If necessary, an adapter collar 34 is also used to precisely adapt the inner diameter of the collar 12 to the outer diameter of the spindle 13. Next a centering mandrel 35 containing a centering pin 36 is attached to spindle 13 and the tool setting device is positioned on the spindle so that the feeler 28 can be moved into engagement with the centering pin 36, as shown in FIG. 1. At this position the base collar 12 is tightened over the spindle by means of bolts 37 and the device is ready to be centered relative to the axis of rotation of the spindle of the particular machine on which the device is mounted.

Centering is accomplished by precisely setting the zero point of the vernier scale 17 opposite the zero point of the true scale 15, as shown in FIG. 1, and then adjusting the indicator gauge to the proper position. Thus the adjustment knob 24 is turned to bring the feeler 28 into contact with the surface of the centering pin so that the pointer 27 is precisely opposite the zero mark on dial 26. Generally indicator gauges are calibrated or adjustable so that a small amount of movement of the feeler is required to bring it up to the zero mark. Then the adjustment knob 24 is turned to depress the feeler 28 precisely one-half the thickness of the centering pin 36, as indicated by the movement of the pointer 27 over the dial 26. The centering pin 36 has a known precise diameter or thickness, most commonly 0.200 inch, so that the desired depression of the feeler is 0.100 inch. The particular gauge illustrated in the drawings is calibrated so that two complete revolutions of the pointer 27 around the dial 26 and back to the zero mark indicate that the feeler has been depressed exactly 0.100 inch. At this precise position the lock bolt 25 is tightened against the slide nut 22 of the indicator element 19 to lock the gauge 20 in position relative to the housing 21. Now the zero mark of the indicator gauge coincides precisely with the center of rotation of the machine spindle and with the precise vernier indication of the zero mark on the true scale 15, as illustrated by FIG. 1.

Next the centering mandrel 35 is removed from the spindle and replaced with a boring tool 38 comprising a mandrel or collet 39 adjustably holding a cutting bit 40, as shown by FIG. 4. The precise radius of the hole to be bored is determined and the vernier element 16 is moved relative to the scale member column 14, as shown by broken lines in FIG. 1 and as illustrated by FIG. 5, until the zero mark of the vernier scale 17 is positioned on the true scale 15 relative to the precise radius desired, the vernier scale enabling this positioning to be accomplished within a tolerance of one onethousandth of an inch.

Finally, the boring bit 40 is adjusted in the mandrel 39 until the outermost tip of bit 40 contacts the tip of feeler 28 and the pointer 27 coincides exactly with the zero mark on dial 26 of the gauge 20, as shown by FIG. 4. The bit is then tightened in the mandrel to secure it in position. If desired, the perfection of the spindle 13 and/or mandrel 39 may be checked by loosening the collar 12 slightly, using expansion screw 41 if necessary, and rotating the device to one or more different positions on the spindle and again bringing the tip of the bit 40 into contact with the feeler 28 to see whether the pointer 27 coincides with the zero mark on the dial 26 at those different positions. Generally no substantial variation will be found but if there is variation, then the bit 40 can be repositioned and secured at a position midway between the extremes of variation to provide the greatest possible accuracy.

Once the boring tool is set in position, the setting device is removed from the spindle and the boring machine is ready for use. If it becomes necessary to reset the boring tool, i.e. to cut a hole of a different size or after removal and sharpening of the bit, it is not necessary to reset the indicator gauge to the axis of rotation of the spindle since the gauge is already positioned correctly for the spindle of the particular machine being used. Furthermore, in cases where the bit is removed merely for sharpening and the dimension of the hole to be bored is not changed, then the scale setting of the device need not be readjusted.

In cases where a centering mandrel is unavailable or where it is desired to simplify the use of the tool setting device of the present invention, it is possible to set the indicator gauge to the axis of rotation of the spindle through the use of the spindle itself as a centering means. The spindle has a known standard or determinable diameter which is generally 2.000 inches but may be 2.625 inches, 3.000 inches or 3.250 inches, depending upon the type of machine used. Provided that the spindle is sufficiently long, the device is attached to the spindle 13 at a point where the feeler 28 of the indicator gauge 20 also overlies the spindle. The vernier scale 17 is positioned opposite the true scale 15 at a reading precisely corresponding to the radius of the spindle, and then the indicator element 19 is adjusted to bring the feeler 28 into contact with the surface of the spindle 13 and to move the gauge pointer 27 to the zero mark on the gauge dial 26. Then the indicator element 19 is locked in place at a position at which it is precisely set to the axis of rotation of the spindle. Finally, the device is loosened on the spindle and moved towards the end thereof so that the indicator feeler 28 overlies the cutting tool to be adjusted. The radius of the desired hole is determined and the vernier scale 17 and true scale 15 are set to that precise radius. Then the cutting bit 40 is moved against the feeler 28 until the gauge pointer 27 is opposite the zero reading on the dial 26, and the bit is tightened.

It will be apparent to those skilled in the art of using boring machines that the cutting tool setting device of the present invention is sufficiently simple that it can be manufactured relatively inexpensively even though the device must be extremely precise. The scale member column 14 must be secured to the base collar in such a manner that it extends truly perpendicular to the axis of rotation of the spindle on which the collar is attached. Any variation from the perpendicular will degrade the accuracy of the device, particularly when the vernier scale is set at higher readings on the true scale. Also the vernier element 16 must firmly slidably engage the scale member column so that the indicator gauge and the scale member column are parallel to each other. The true scale 15 need not be precisely positioned on the scale member column 14 since the indicator gauge is adjustably mounted to set the device to the axis of rotation of the spindle when the vernier scale is positioned at the zero mark of the true scale. Also, for this same reason, the extension bar 18 need not be truly parallel to the axis of rotation of the spindle nor precisely attached to the vernier element or to the indicator element, provided however that the attachment must be secure.

Obviously the length of the true scale can be varied to provide setting devices for use in setting boring tools to cut holes having radii of any desired size, such as twelve or more inches. However, the device illustrated, having a maximum radius setting of about six inches, is most practical for satisfying the ordinary requirements of a boring machine operator. Also interchangeable extension bars 18 of different lengths may be used, ranging for instance from 4 to 12 inches in length.

In order to insure accuracy, the present tool setting device is preferably made from tool steel, hardened, ground and lapped. The cavity of the vernier slide element is ground square and lapped to fit the scale member column. Gibs preferably are installed in the slide element to provide for eventual wear. The scale member column is square with the base collar within a tolerance of 0.0002 of 0.001 inch and the column itself is square within 0.0002 inch. The graduations on the vernier and true scale are calibrated to precise tolerance to insure accuracy.

It is possible to make the present device from aluminum, using hardened steel ways ground and lapped and bolted to the scale member column cavity, also using gibs to take up eventual wear. Meehanite cast iron is a preferred material.

The mounting collar and adapters are bored within 0.001 inch on the plus side in order to facilitate slippage of the device onto the machine spindle. The collar and adapters are slotted to allow for expansion and contraction.

The indicator gauge illustrated by the drawings is of the most conventional type. However variations are possible within the spirit of the present invention, particularly with respect to the feeler which can conveniently have a precise flat surface to facilitate the positioning of the feeler against the tip of the cutting bit.

Variations and modifications may be made within the scope of the claims and portions of the improvements may be used without others.

I claim:

1. A tool setting device adapted to be attached to a boring machine for purposes of precisely setting a cutting tool in the spindle of a boring machine, the device comprising a mounting element and a carriage element slidably attached to the mounting element, said mounting element comprising base means adapted to releasably attach the device over the spindle of a boring machine comprising a contractable collar adapted to encircle the spindle of the boring machine and to be tightened in centered position thereover and a scale member column extending from said base means in a direction which is perpendicular to the axis of the spindle when the device is attached thereover and containing a true scale having graduations corresponding to the dimension of the hole to be cut by the cutting tool, said carriage element comprising vernier means slidably attaching said carriage element to said scale member column and including a vernier scale in cooperative association with said true scale to enable the precise adjustment of the carriage element relative to the mounting element corresponding exactly to the desired setting of the cutting tool, an extension element fixed to and extending from said vernier element, an indicator element fixed to said extension element and comprising an indicator dial gauge which is adjustably mounted on said indicator element, means for adjusting the position of said indicator gauge relative to said indicator element in a direction parallel to said scale member column and towards and away from the axis of the spindle to indicate the location of said axis, and means for locking said indicator gauge to said indicator element at an adjusted position corresponding to the axis of said spindle, whereby in use said indicator gauge can be adjusted and locked on said indicator element at a position corresponding to the location of the axis of the spindle relative to said true scale and said carriage element can be precisely positioned relative to said true scale by means of said vernier scale to position the indicator element a precise distance from the axis of the spindle corresponding to the diameter of the hole to be bored.

2. A tool setting device according to claim 1 in which a threaded drive member is rotatably mounted on said mounting element and threadably engages said carriage element to facilitate the precise adjustment of the position of the vernier scale relative to the true scale.

3. A tool setting device according to claim 2 in which said carriage element is provided with means for releasing the engagement with said threaded drive member to permit the free adjustment of the position of the vernier scale relative to the true scale.

4. A tool setting device according to claim 1 in which the collar is provided with a contractable adapter collar to adapt the device for use on a spindle of reduced diameter.

5. A tool setting device according to claim 1 in which said indicator element comprises a housing fixed to said extension element, a drive element rotatably mounted within said housing, said indicator gauge being threadably engaged by said drive element for movement towards and away from said housing, and a locking member for securing the indicator gauge at any desired position relative to the housing.

6. A tool setting device according to claim 1 in which the extension element of the carriage element is removable for replacement by another extension element of different length.

* * * * *